United States Patent
Binder et al.

(10) Patent No.: US 12,164,923 B2
(45) Date of Patent: Dec. 10, 2024

(54) ACCELERATING PREDICATED INSTRUCTION EXECUTION IN VECTOR PROCESSORS

(71) Applicant: Advanced Micro Devices, Inc., Santa Clara, CA (US)

(72) Inventors: Elliott David Binder, Pittsburgh, PA (US); Onur Kayiran, Santa Clara, CA (US); Masab Ahmad, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 22 days.

(21) Appl. No.: 17/853,790

(22) Filed: Jun. 29, 2022

(65) Prior Publication Data

US 2024/0004656 A1 Jan. 4, 2024

(51) Int. Cl.
*G06F 9/30* (2018.01)
*G06F 9/38* (2018.01)

(52) U.S. Cl.
CPC ...... *G06F 9/30145* (2013.01); *G06F 9/30036* (2013.01); *G06F 9/30072* (2013.01); *G06F 9/3851* (2013.01); *G06F 9/3887* (2013.01)

(58) Field of Classification Search
CPC ............. G06F 9/30036; G06F 9/30038; G06F 9/30072; G06F 9/3842; G06F 9/3887; G06F 9/38873; G06F 9/38875; G06F 9/3888; G06F 9/38885
See application file for complete search history.

(56) References Cited

U.S. PATENT DOCUMENTS

| 5,940,625 | A  | * | 8/1999 | Smith | G06F 15/8084 |
|---|---|---|---|---|---|
| | | | | | 712/E9.05 |
| 2014/0059328 | A1 | * | 2/2014 | Gonion | G06F 9/3861 |
| | | | | | 712/222 |
| 2014/0095850 | A1 | * | 4/2014 | Plotnikov | G06F 9/38 |
| | | | | | 712/241 |
| 2014/0181477 | A1 | * | 6/2014 | Vaidya | G06F 9/30181 |
| | | | | | 712/208 |
| 2019/0042257 | A1 | * | 2/2019 | Baum | G06F 9/3013 |

(Continued)

OTHER PUBLICATIONS

A. Barredo, J. M. Cebrian, M. Moreto, M. Casas and M. Valero, "Improving Predication Efficiency through Compaction/Restoration of SIMD Instructions," 2020 IEEE International Symposium on High Performance Computer Architecture (HPCA), San Diego, CA, USA, pp. 717-728 (Year: 2020).*

(Continued)

*Primary Examiner* — Andrew Caldwell
*Assistant Examiner* — Kasim Alli
(74) *Attorney, Agent, or Firm* — Volpe Koenig (57) ABSTRACT

Methods and systems are disclosed for processing a vector by a vector processor. Techniques disclosed include receiving predicated instructions by a scheduler, each of which is associated with an opcode, a vector of elements, and a predicate. The techniques further include executing the predicated instructions. Executing a predicated instruction includes compressing, based on an index derived from a predicate of the instruction, elements in a vector of the instruction, where the elements in the vector are contiguously mapped, then, after the mapped elements are processed, decompressing the processed mapped elements, where the processed mapped elements are reverse mapped based on the index.

18 Claims, 6 Drawing Sheets

(56) References Cited

U.S. PATENT DOCUMENTS

2019/0205358 A1\* 7/2019 Diril ...................... G06N 3/063
2020/0159529 A1\* 5/2020 Sen ....................... G06F 9/3887

OTHER PUBLICATIONS

J. M. Cebrian et al., "Compiler-Assisted Compaction/Restoration of SIMD Instructions," in IEEE Transactions on Parallel and Distributed Systems, vol. 33, No. 4, pp. 779-791 (Year: 2022).\*

Kapasi, U. J., et al., "Efficient Conditional Operations for Data-parallel Architectures", Proceedings of the 33rd Annual International Symposium on Microarchitecture, Dec. 2000, 12 pgs.

\* cited by examiner

ACCELERATING PREDICATED INSTRUCTION EXECUTION IN VECTOR PROCESSORS

BACKGROUND

Vector processors utilize single instruction multiple data (SIMD) execution units. Current SIMD units can support hardware execution datapaths with a width that ranges between 128 to 512 bits. This execution datapath width is independent of the software vector that a software application uses. For example, a software vector of up to 2,048 bits can be served by a vector processor having a 128-bit wide execution datapath that can process the software vector in 16 execution cycles. SIMD units are also capable of processing predicated instructions. However, when used to process long software vectors that are highly predicated, during execution cycles, many of the lanes in these SIMD units are left inactive (masked out by the predicate), resulting in inefficient utilization of the SIMD hardware.

BRIEF DESCRIPTION OF THE DRAWINGS

A more detailed understanding may be had from the following description, given by way of example in conjunction with the accompanying drawings wherein.

DETAILED DESCRIPTION

Inefficiency resulting from processing a highly predicated software vector by a vector processor can be resolved by compressing the software vector—that is, by contiguously mapping the vector elements of the software vector, that are enabled by the predicate, before dispatching them into the execution datapath of the vector processor. Compressing highly predicated software vectors can increase the performance of workloads that can be otherwise bottlenecked by the throughput of arithmetic logic units (ALUs) in SIMD units of the vector processor.

Aspects disclosed herein describe methods for processing a vector by a system, employing a vector processor. The methods comprise receiving, by a scheduler, predicated instructions. Each of the predicated instructions is associated with an opcode, a vector of elements, and a predicate. The methods further comprise executing the predicated instructions, where the executing of a predicated instruction of the predicated instructions comprises compressing, by a compressor, based on an index derived from a predicate of the predicated instruction, elements in a first vector of the predicated instruction, where the elements in the first vector are contiguously mapped into a second vector. Then, processing, by an execution unit, the mapped elements in the second vector, generating processed mapped elements, and, next decompressing, by a decompressor, the processed mapped elements in the second vector, where the processed mapped elements are mapped into a third vector based on the index.

Aspects disclosed herein describe also systems, employing a vector processor, for processing a vector. The systems comprise at least one processor and memory storing instructions. The instructions, when executed by the at least one processor, cause the systems to receive, by a scheduler, predicated instructions. Each of the predicated instructions is associated with an opcode, a vector of elements, and a predicate. The instructions further cause the systems to execute the predicated instructions. Where, to execute a predicated instruction of the predicated instructions, the instructions cause the systems to compress, by a compressor, based on an index derived from a predicate of the predicated instruction, elements in a first vector of the predicated instruction, where the elements in the first vector are contiguously mapped into a second vector. Then, the instructions cause the systems to process, by an execution unit, the mapped elements in the second vector, generating processed mapped elements, and, next, to decompress, by a decompressor, the processed mapped elements in the second vector, where the processed mapped elements are mapped into a third vector based on the index.

Further, aspects disclosed herein describe a non-transitory computer-readable medium comprising instructions executable by at least one processor to perform methods for processing a vector by a system, employing a vector processor. The methods comprise receiving, by a scheduler, predicated instructions. Each of the predicated instructions is associated with an opcode, a vector of elements, and a predicate. The methods further comprise executing the predicated instructions, where the executing of a predicated instruction of the predicated instructions comprises compressing, by a compressor, based on an index derived from a predicate of the predicated instruction, elements in a first vector of the predicated instruction, where the elements in the first vector are contiguously mapped into a second vector. Then, processing, by an execution unit, the mapped elements in the second vector, generating processed mapped elements, and, next decompressing, by a decompressor, the processed mapped elements in the second vector, where the processed mapped elements are mapped into a third vector based on the index.

Figure 1:
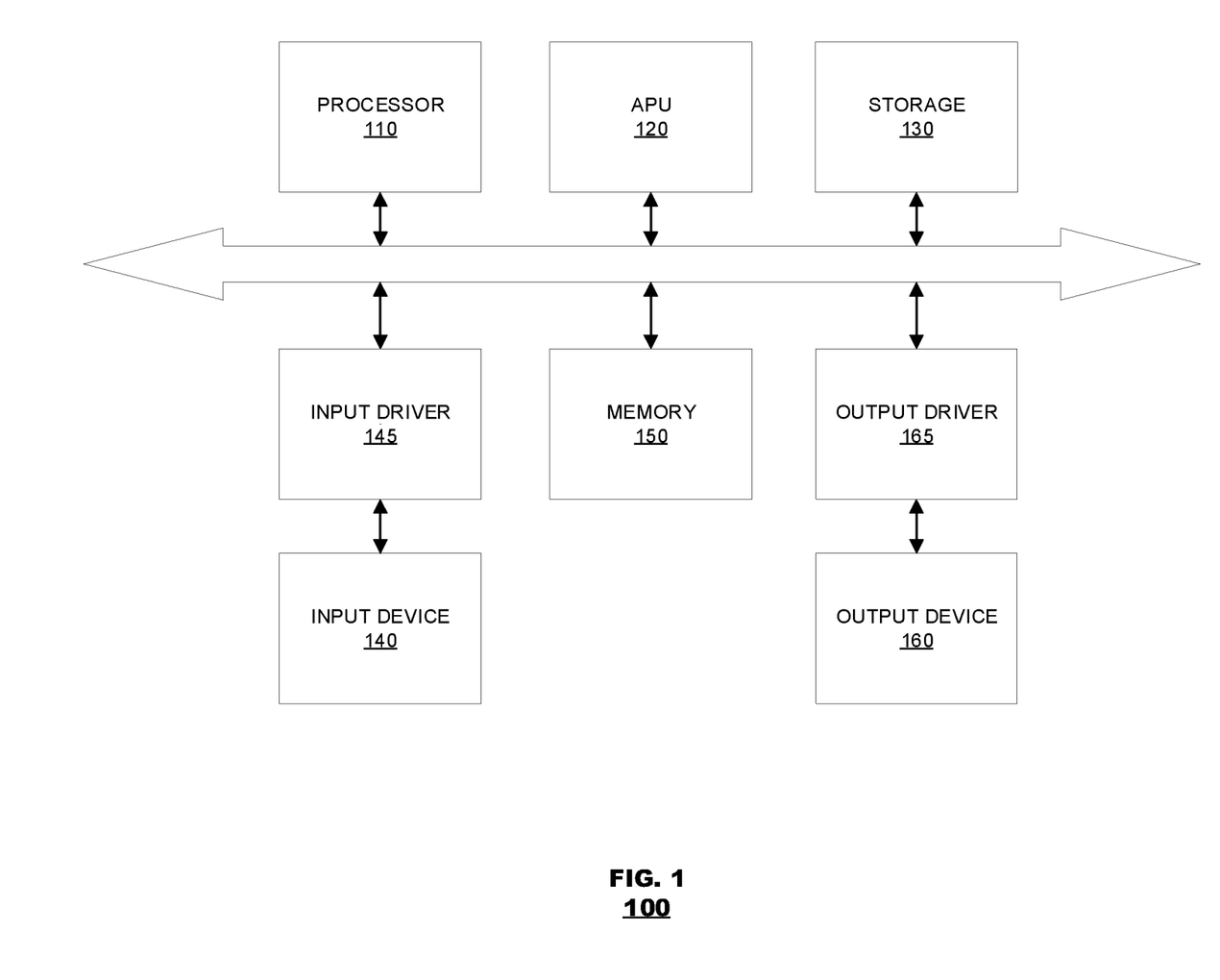
FIG. 1 is a block diagram of an example device, based on which one or more features of the disclosure can be implemented.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 can include a processor 110, an accelerated processing unit (APU) 120, storage 130, an input device 140, memory 150, and an output device 160. The device 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the device 100 can include additional components not shown in FIG. 1.

The APU 120 can be any type of accelerator. The APU 120 can represent a graphics processing unit (GPU), that is, a shader system comprising one or more computing units that are configured to perform computations in parallel, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160). In alternative aspects, the APU 120 can be employed to perform signal processing operations (e.g., when embodied in a digital signal processor (DSP)), to perform accelerated operations through the use of a field programmable gate array (FPGA) configured by a bitstream, to perform neural processing operations through the use of a neural processing unit (NPU), or to perform other operations that may be more efficiently performed through the use of an accelerated processing unit rather than by processor 110.

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

A vector processor that vectorizes a workload, typically, relies on data-dependent execution via the use of predication. Thus, when processing a software vector, ignoring some of the vector elements (based on a corresponding predicate) reduces the utilization efficiency of the SIMD units of the vector processor. By identifying and excluding the vector elements that need not be operated on before they reach the hardware execution path, corresponding lanes of the SIMD units can be available to perform other operations. Techniques for increasing the utilization efficiency of the SIMD units of a vector processor that processes predicated vector instructions are described below.

Figure 2:
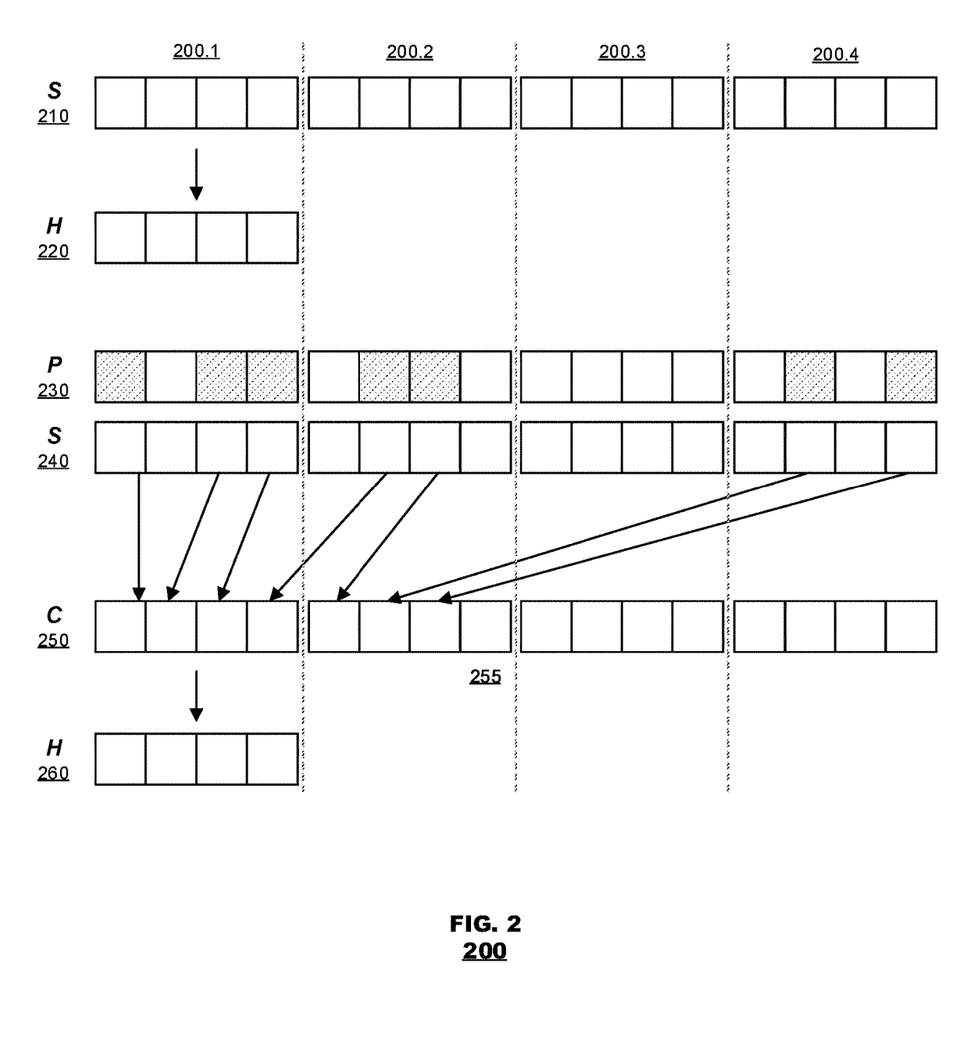
FIG. 2 is a diagram that illustrates compression of a predicated vector, based on which one or more features of the disclosure can be implemented.

FIG. 2 is a diagram that illustrates compression of a predicated vector. A vector processor can execute predicated instructions on software vectors (as defined by the vector processor's architectural interface) that are wider than its hardware execution datapath (as defined by the vector processor's microarchitecture). In such a case, each instruction executes over multiple cycles. An instruction, typically, encodes the operation (opcode) to be performed on vector elements of a software vector by lanes in the SIMD units of the vector processor. As illustrated in FIG. 2, a software vector S 210 can contain $N_S$ vector elements (e.g., $N_S$=16 in the example of FIG. 2). In one cycle of operation, for example, the hardware execution datapath (including SIMD units) of the vector processor can operate on data in its input hardware register, represented herein by hardware vector H 220. The hardware vector H 220 may be shorter than the software vector, having only $N_H$ vector elements (e.g., $N_H$=4 in the example of FIG. 2). Thus, in each cycle of execution, a section of the software vector S, for example, each of sections 200.1-4, can be dispatched to the hardware vector H 220 to be processed by the SIMD units of the vector processor. Thus, the number of execution cycles required to execute all the vector elements in the software vector S 210 is $N_C=N_S/N_H$ (e.g., $N_C$=4 in the example of FIG. 2). Note that some instructions may need more than one cycle to process each of the sections 200.1-4 of the software vector S 210.

In a case where a predicated instruction is used, in which the operation (opcode) encoded in the predicated instruction is to be applied only to some elements in the software vector S, not all the lanes in the SIMD units of the vector processor are employed. That is, some of the SIMD lanes within the hardware execution datapath may be inactive during the $N_C$ cycles of execution. A predicate (mask vector) P 230, associated with the predicated instruction, is illustrated in FIG. 2. The predicate P 230 indicates which vector elements of the software vector S 240 are enabled (patterned elements of P 230) and which are disabled (non-patterned elements of P 230). As illustrated, vector elements: 0, 2, and 3 in section 200.1; 5 and 6 in section 200.2; and 13 and 15 in section 200.4 are enabled by the predicate P 230. In such a case, when each of sections 200.1-4 of the software vector S 240 is dispatched to the hardware vector H 260 (in four respective cycles) to be operated on by lanes of the SIMD units, some of the SIMD lanes (those correspond to the vector elements that are disabled by the predicate P 230) will be inactive. To overcome this inefficiency the vector S 240 can be compressed according to the predicate P 230. To that end, the vector elements in the software vector S 240 that are enabled by the predicate P 230 are contiguously mapped (that is, compressed) into sections 200.1 and 200.2 of vector C 250, as illustrated by in FIG. 2. Thus, only two execution cycles are required to apply the opcode (encoded in the predicated instruction) on the vector elements in vector C 250.

By reducing the number of cycles required to apply a predicated instruction to a software vector, the cycles saved can be used for the processing of other instructions on the same vector or other vectors. Moreover, by detecting, during a cycle, inactive vector elements in the hardware vector 260, corresponding lanes of the SIMD units can be freed up to execute other processing. For example, the eighth vector element 255 in C 250 is not populated by the compression described above (that is, no vector element from S 240 had been mapped to it). As a result, in the second cycle of operation, when section 200.2 of C is dispatched to the hardware vector 260, the fourth element in the hardware vector will be inactive. Detecting such an inactive element in the hardware vector 260, allows for the assignment of the corresponding SIMD lane to execute other operations.

Figure 3:
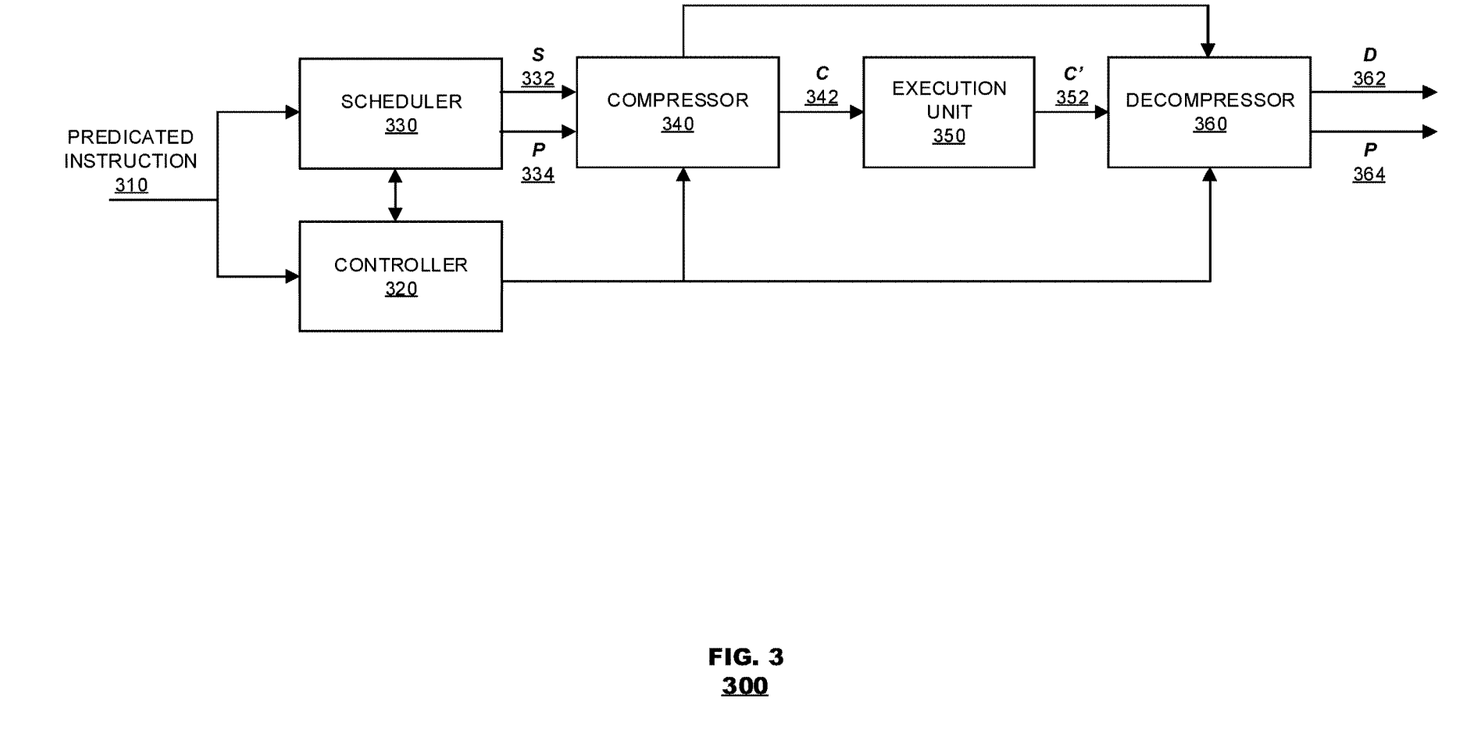
FIG. 3 is a block diagram of a system for processing a vector by a vector processor, based on which one or more features of the disclosure can be implemented.

FIG. 3 is a block diagram of a system 300 for processing a vector by a vector processor. The system 300 can be embedded in or used by the processor 110 or the APU 120 of FIG. 1. The system 300 includes a controller 320, a scheduler 330, a compressor 340, an execution unit 350, and a decompressor 360. The system's 300 components 320, 330, 340, 350, 360 include processing units that implement respective functionality disclosed herein by software, firmware, hardware, or a combination thereof. The scheduler 330 is configured to queue and schedule predicated instructions 310 it receives as its input. The scheduler 330 outputs a software vector S 332 and a predicate P 334, associated with the received predicated instruction 310. Based on the predicate P 334, the compressor 340 maps the software vector S 332 into a compressed vector C 342. The compressed vector C 342 is then fed into the execution unit 350 for processing. The execution unit 350 can contain SIMD units including SIMD lanes (or threads), each of which can employ ALUs to process a vector element in C 342. That is, each lane can apply the opcode encoded in the predicated instruction 310 to a vector element from C 342, resulting in corresponding processed vector elements in C'352. The processed vector C' 352 is then decompressed back into D 362 according to an index I 344 provided by the compressor. The index I 344 encodes the mapping performed by the compressor 340 to allow the decompressor 360 to reverse that mapping. Thus, the decompressor 360 outputs D 362 (a processed version of the input vector S 332) and a corresponding predicate P 364.

Applying the compression and decompression, illustrated in FIG. 3, consumes time, and, thus, introduces latency into the execution of predicated instructions 310. However, performance can be increased if the compression 340 and decompression 360 employed by the system 300 is applied during workloads in which ALUs (in the execution unit 350) are extensively utilized to process highly predicated software vectors.

The controller 320 is configured to disable or enable the compression operation. A compression operation, as defined herein, includes the system's 300 functionality that is associated with the compression 340 and decompression 360 described above. The controller 320 can base the decision whether to enable or disable the compression operation based on various metrics. In an aspect, a metric can be the level of sparsity of the predicate P 334 associated with a predicated instruction 310. If the determined sparsity level is below a threshold, the compression operation is disabled. In such a case, the software vector S 332 is served directly to the execution datapath (of the execution unit 350) that processes it in a maximum number of cycles: $N_C = N_S / N_H$. The controller 320 can be configured to determine the level of sparsity from the predicate associated with the predicated instruction 310, for example, by counting the bits in the predicate P 230 that represent disabled elements in S (e.g., the not patterned blocks in P 230). The threshold can be determined based on multiple factors, such as the $N_S$ to $N_H$ ratio, a configuration parameter associated with the system 300, and/or a parameter set by the user.

As mentioned before, the tradeoff of improving workload throughputs when employing the compressor 340 and decompressor 360 is the latency introduced to the system 300. Thus, in an aspect, the controller 320 can be configured to enable the compression operation only when the introduced latency is likely to be hidden. For example, if the compression 340 is expected to take N cycles to be completed, the compression is effectively hidden when the ALUs in the execution unit 350 are busy during those N cycles. Otherwise, if the ALUs are mostly inactive during those N cycles, the benefit provided by employing the compressor 340 and decompressor 360 diminishes. Thus, the likelihood of the introduced latency to be hidden can be assessed by the controller 320, and can be used as a metric based on which the controller determines whether to enable or disable the compression operation.

The performance benefits associated with the compression operation will likely be observed when the workload is throughput-limited rather than latency-limited, where throughput-limited workloads can usually hide latencies. If the ALUs in the execution unit 350 are always utilized, executing fewer operations will likely improve performance. If latency of every operation is already low before enabling the compression operation, it may be difficult to obtain performance benefits. One way to determine whether performance benefits can be obtained when the compression operation is enabled is by monitoring periodically the ALUs' utilization. The ALUs' utilization when the compression operation is disabled can be compared with the ALUs' utilization when the compression operation is enabled. If the ALUs' utilization decreases when the compression operation is enabled, then it is likely that the compression operation has resolved bottleneck issues related to the operation of the ALUs.

Additionally, or alternatively, the controller can use other metrics to determine whether to enable or disable the compression operation, such as the hardware design (e.g., architecture of the execution unit 350), the nature of the workload, a configuration parameter associated with the system 300, a parameter set by a user, and/or the number of predicated instructions that are queued by the scheduler 330, waiting to be executed by the execution unit 350.

It is possible for the compressor 340 and/or decompressor 360 to operate at any particular rate. For example, it is possible for the compressor 240 to generate sufficient compressed operands for a single cycle (e.g., the width of the ALU), or for multiple cycles.

Figure 4:
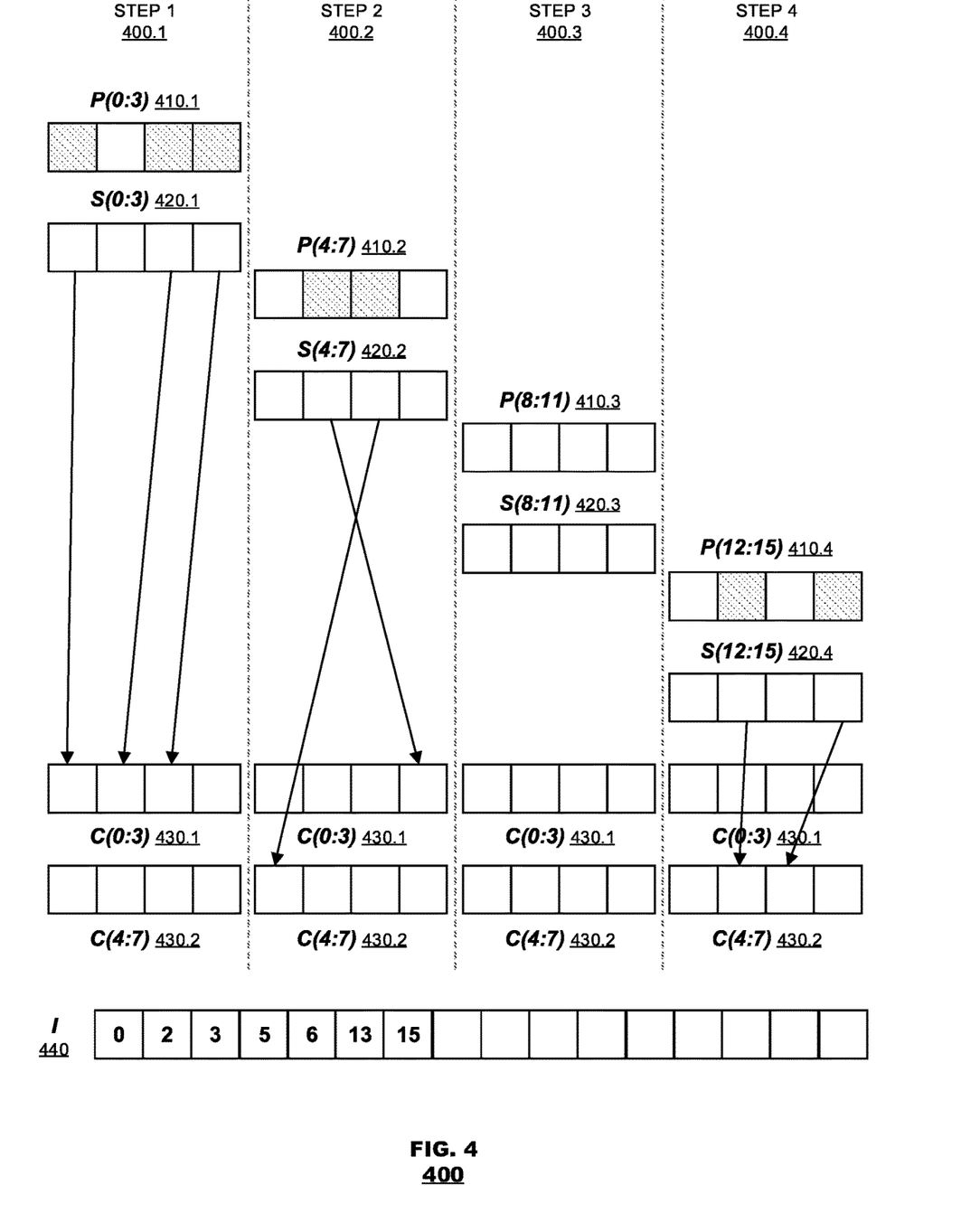
FIG. 4 is a diagram that illustrates the compression employed by the system of FIG. 3, based on which one or more features of the disclosure can be implemented.

FIG. 4 is a diagram that illustrates the compression employed by the system of FIG. 3. As shown in the FIG. 3 and FIG. 4, the compressor 340 maps the software vector S 332, 420 in accordance with the predicate 334, 410 to the compressed vector C 342, 430, in four steps 400.1-4. In the first step 400.1, the vector elements in S(0:3) 420.1 are mapped into C 430.1 based on the corresponding predicate information in P(0:3) 410.1. Accordingly, the vector elements 420.1 at indexes 0, 2, and 3 (that are enabled in P(0:3) 410.1) are mapped into the first three contiguous elements in C 430.1. These indexes are recorded in the index vector 1440 (that is, I(0)=0, I(1)=2, and I(2)=3). In the second step 400.2, the vector elements in S(4:7) 420.2 are mapped into C 430 based on the corresponding predicate information in P(4:7) 410.2. Accordingly, the vector elements 420.2 at indexes 5 and 6 (that are enabled in P(4:7) 410.2) are mapped into the next two contiguous elements in C 430.1-2. These indexes are recorded in the index vector 1440 (that is, I(3)=5 and I(4)=6). In the third step 400.3, none of the vector elements in S(8:11) 420.3 are mapped into C 430 because none are enabled in the corresponding predicate information in P(8:11) 410.3. In the fourth step 400.4, the vector elements in S(12:15) 420.4 are mapped into C 430 based on the corresponding predicate information in P(12:15) 410.4. Accordingly, the vector elements 420.4 at indexes 13 and 15 (that are enabled in P(12:15) 410.4) are mapped into the next two contiguous elements of C 430.2. These indexes are recorded in the index vector I 440 (that is, I(5)=13 and I(6)=15). Hence, in the example of FIG. 4, vector elements that were stored across four sections of a software vector S 420, based on the predicate P 410, are mapped into two sections: C(0:3) 430.1 and C(4:7) 430.2 of the compressed vector C 430. And, thus, only two cycles are required for these sections 430.1-2 to be processed by the execution unit 350.

Figure 5:
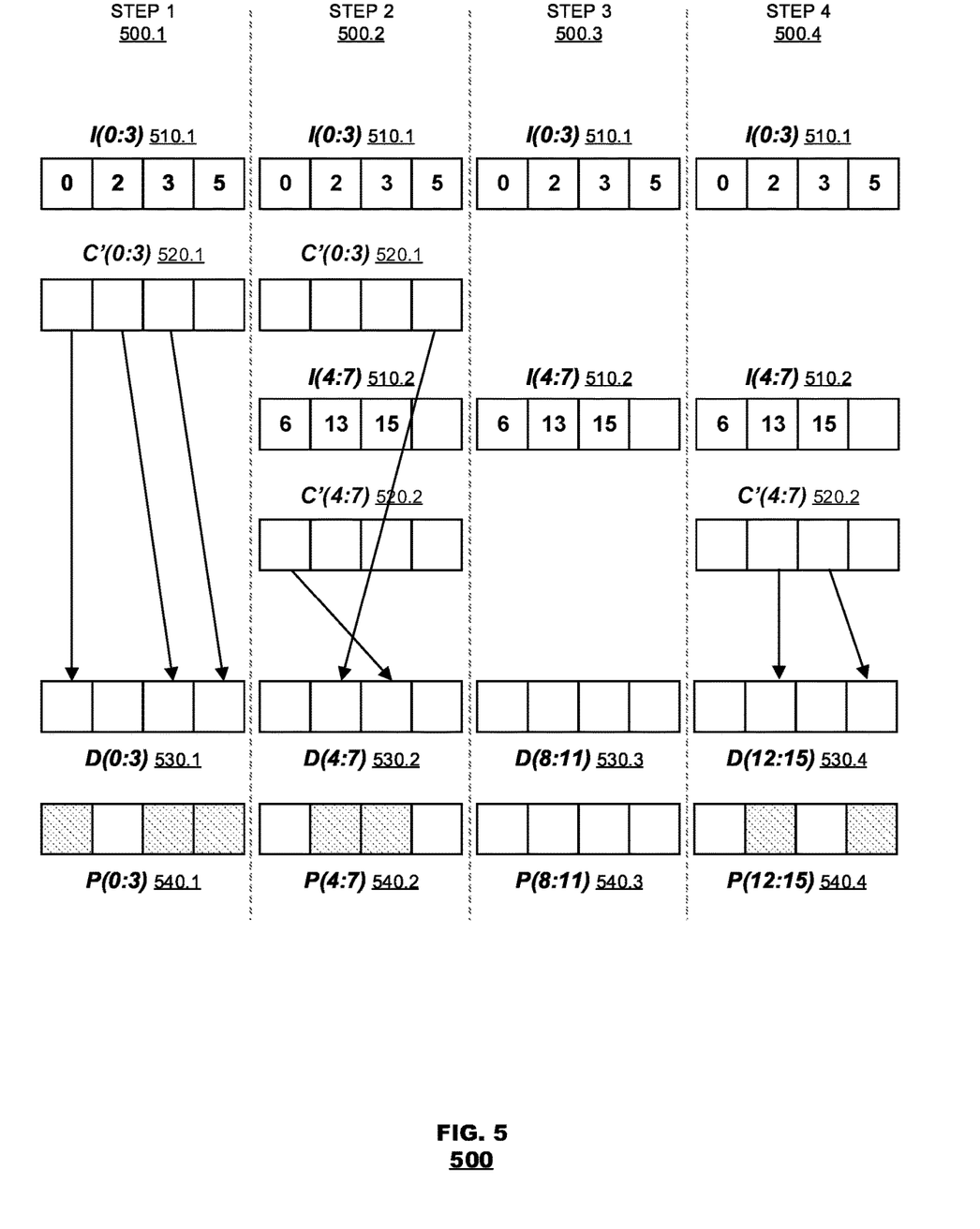
FIG. 5 is a diagram that illustrates the decompression employed by the system of FIG. 3, based on which one or more features of the disclosure can be implemented.

FIG. 5 is a diagram that illustrates the decompression employed by the system of FIG. 3. As shown in the FIG. 3 and FIG. 5, the decompressor 360 maps the output of the execution unit 350, that is, C' 352, 520, into a vector D 362, 530 to reverse the mapping performed by the compressor 340 (as described in reference to FIG. 4). To that end, in four steps 500.1-4, the decompressor 360 uses the index vector I 344, 440, 510, generated by the compressor 340, as follows. In the first step 500.1, based on the indexes recorded in I 510.1 (that is, I(0)=0, I(1)=2, and I(2)=3) vector elements from C'(0:3) 520.1 are mapped back to their place in vector elements D(0:3) 530.1 and the corresponding predicate P(0:3) 540.1 is generated accordingly. In the second step 500.2, based on the indexes recorded in I 510.1-2 (that is, I(3)=5 and I(4)=6) vector elements from C'(0:3) 520.1 and C'(4:7) 520.2 are mapped back to their place in vector elements D(4:7) 530.2 and the corresponding predicate P(4:7) 540.2 is generated accordingly. In the third step 500.3, based on the indexes recorded in I 510 no vector elements from C' 520 has to be mapped back to vector elements D(8:11) 530.3 and the corresponding predicate P(8:11) 540.3 is generated accordingly. In the fourth step 500.4, based on the indexes recorded in I 510.2 (that is, I(5)=13 and I(6)=15) vector elements from C'(4:7) 520.2 are mapped back to their place in vector elements D(12:15) 530.4 and the corresponding predicate P(12:15) 540.4 is generated accordingly. Hence, in the example of FIG. 5, the result of the operation (opcode) encoded in the predicated instruction 310, as applied to the enabled vector elements in S 332, 420 according to the corresponding predicate P 334, 410, is provided in D 362, 530.

It is possible for the rate of compression to be the same as or greater than the SIMD execution rate. For example, it is possible for the compression to compress operands for the amount of data items that can be executed in a SIMD manner in one cycle or to be greater than this amount.

It is possible for the compression and decompression to be implemented as a single pipeline or as multiple decoupled pipelines. In the single pipeline implementation, decompression operations follow compression operations in the pipeline architecture. This means that when stalls occur for compression or decompression, a stall also occurs for the other action. In an example, a later instruction is dependent on an earlier instruction. If the later instruction needs to stall because the earlier instruction has not produce its output, this means that both the compression and decompression portions of the pipeline for the later instruction will stall. Decoupling the compression pipeline from the decompression pipeline allows either decompression or decompression to proceed even if the other is stalled. For example, a decompression pipeline can operate and place compressed vectors into a working compressed vector memory even if the decompression pipeline is stalled. In some examples, the working compressed vector memory is one or more registers. Similarly, the decompression pipeline can read from the working compressed vector memory and decompress those vectors even if the compression pipeline is stalled. In addition to the above, the compression and decompression could execute out of order. In the case that a compression pipeline or decompression pipeline begins execution while an instruction upon which the execution depend has not yet retired, the compression pipeline or decompression pipeline re-executes after the depending instruction is retired.

In addition to the above, it is possible for the compressor and/or decompressor to execute independently and speculatively. In an example, the compressor predicts the predication for an instruction, produces compressed operands based on the compression, and provides those compressed operands to the working compressed vector memory. In the event of a misprediction (for example, an prior instruction produces results that indicate that the predicted predication was wrong, or that the operands that were compressed were wrong), the state related to the speculatively executing instruction is rolled back and the instruction is executed again. This re-execution includes re-compressing operands, now with non-predicted compressed operands.

Figure 6:
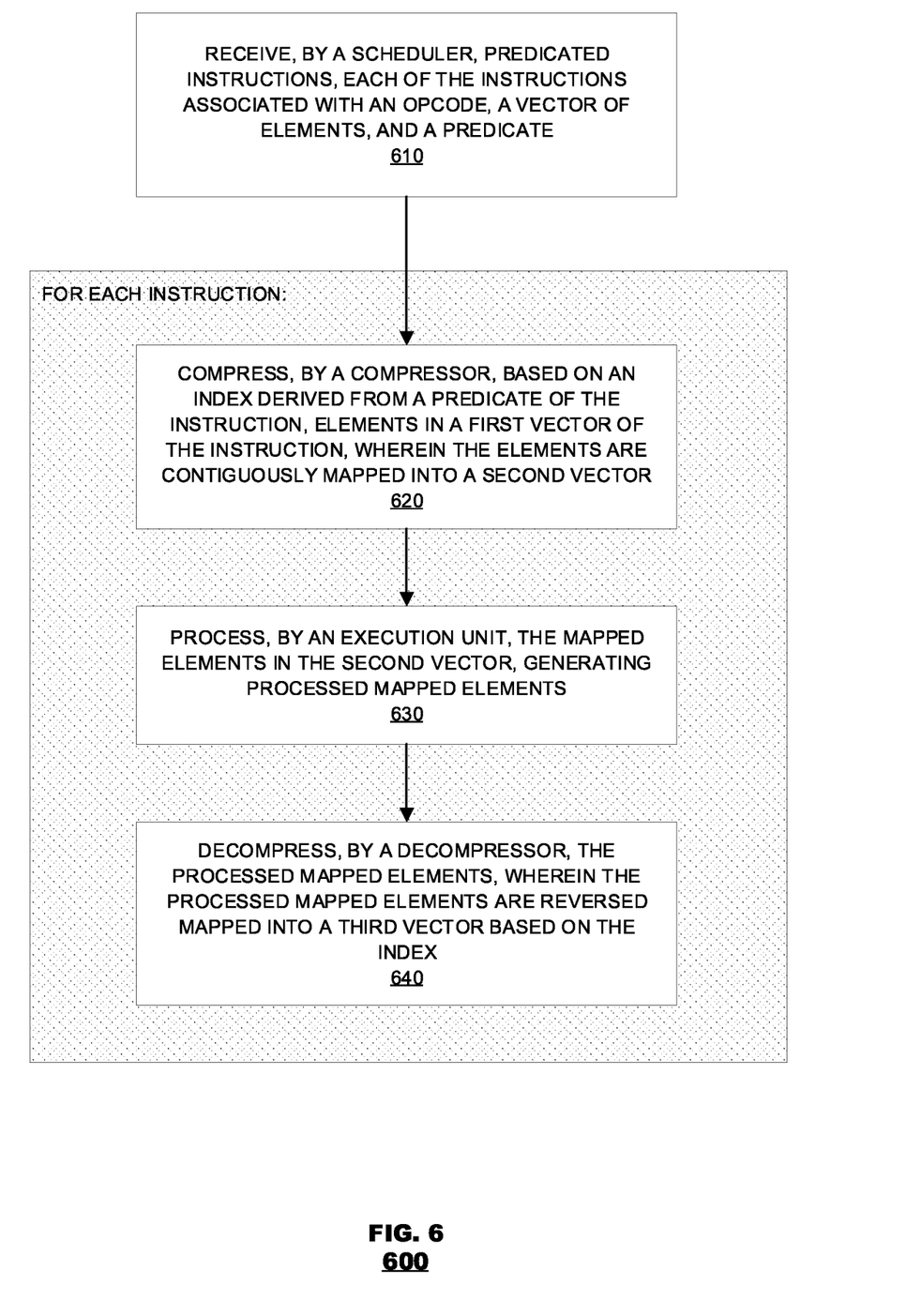
FIG. 6 is a flowchart of an example method for processing a vector by a system, employing a vector processor, based on which one or more features of the disclosure can be implemented.

FIG. 6 is a flowchart of an example method 600 for processing a vector by a system 300, employing a vector processor. The method 600 begins, in step 610, with receiving predicated instructions by a scheduler 330. The received instructions are each associated with an opcode, a vector of elements, and a predicate. Then, the execution of the predicated instructions is carried out in steps 620, 630, and 640. In an aspect, a controller 320 can be used to determine, based on a metric, whether to perform the execution of a predicated instruction according to steps 620, 630, and 640. If it is determined, by the controller 320, that the execution of a predicated instruction should not be carried out according to steps 620, 630, and 640, then, that predicated instruction is processed without employing a compression operation. That is, the elements of the vector of that predicated instruction are processed according to the instruction's associated opcode without employing any system 300 functionality that is associated with the compression 340 (of step 620) and the decompression 360 (of step 640). Hence, a metric can be used to determine whether to perform an execution of a predicated instruction according to steps 620, 630, and 640. Such a metric can be based on the level of sparsity of the predicate of the instruction being processed, a user parameter, a configuration parameter associated with the system 300, the number of the predicated instructions that are queued by the scheduler 330, a prediction that the latency caused by the compressor 340 is a hidden latency, or a combination thereof.

The execution of each of the predicated instructions is carried out for each instruction 310 using the following steps. In step 620, elements in a first vector S 332 of the instruction are compressed by the compressor 340 based on an index I 344 that is derived from a predicate P 334 of the instruction. The compression is performed by, for example, contiguously mapping the elements in the first vector into a second vector C 342. In step 630, the mapped elements in the second vector are processed by the execution unit 350, generating processed mapped elements C' 352. Then, in step 640, the processed mapped elements are decompressed by the decompressor 360. The decompression is performed by, for example, reverse mapping the processed mapped elements C' 352 based on the index I 344 provided by the compressor 340. Hence, for each instruction 310, the decompressor 360 outputs D 362, a processed version of the enabled elements in the vector S 332, together with a corresponding predicate P 364.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in semiconductor manufacturing processes to manufacture processors that implement aspects of the embodiments.

The methods or flowcharts provided herein can be implemented in a computer program, software, or firmware incorporated in a non-transitory computer-readable storage medium for execution by a general-purpose computer or processor. Examples of non-transitory computer-readable media include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for processing a vector by a system, employing a vector processor, comprising:
   receiving, by a scheduler, predicated instructions; and
   executing the predicated instructions, wherein the executing of a first predicated instruction of the predicated instructions comprises:
      compressing elements in a first vector of the first predicated instruction, based on a comparison of a level of sparsity of a predicate of the first predicated instruction to a threshold that is based on a ratio of a number of elements in a hardware vector for executing the first predicated instruction and a number of elements in the first vector of the first predicated instruction, to generate compressed elements that are contiguously mapped as a second vector,
      processing, by an execution unit, the compressed elements to generate processed compressed elements, and
      decompressing the processed compressed elements.

2. The method of claim 1, wherein the processing of the compressed elements is performed in one or more cycles, wherein the processing in a cycle of the one or more cycles comprises:
   dispatching a subset of the compressed elements to the hardware vector of the execution unit; and
   processing each of the elements in the dispatched subset by a corresponding SIMD lane of a first plurality of SIMD lanes of the execution unit according to an opcode of the first predicated instruction.

3. The method of claim 2, wherein:
   the dispatching comprises,
      dispatching the subset of the compressed elements to a portion of the hardware vector, and
      dispatching other vector elements to another portion of the hardware vector; and
   the executing comprises,
      processing the other vector elements by a second plurality of SIMD lanes of the execution unit according to the opcode.

4. The method of claim 1, further comprising:
   for a second predicated instruction of the predicated instructions, determining that compression should not occur.

5. The method of claim 1, further comprising determining that compression should occur in response to the level of sparsity being above the threshold.

6. The method of claim 5, wherein the determining is based on a user parameter, a configuration parameter associated with the system, or a combination thereof.

7. The method of claim 5, wherein the determining is based on a number of the predicated instructions that are queued by the scheduler.

8. The method of claim 1, wherein:
   executing the first predicated instruction is performed speculatively.

9. A system, employing a vector processor, for processing a vector, comprising:
   at least one processor; and
   memory storing instructions that, when executed by the at least one processor, cause the at least one processor to:
   receive, by a scheduler, predicated instructions, and
   execute the predicated instructions, wherein to execute a first predicated instruction of the predicated instructions, the instructions stored in the memory further cause the at least one processor to:
      compress, by a compressor, elements in a first vector of the first predicated instruction, based on a comparison of a level of sparsity of a predicate of the first predicated instruction to a threshold that is based on a ratio of a number of elements in a hardware vector for executing the first predicated instruction and a number of elements in the first vector of the first predicated instruction, to generate compressed elements that are contiguously mapped as a second vector,
      process, by an execution unit, the compressed elements to generate processed compressed elements, and
      decompress the processed compressed elements.

10. The system of claim 9, wherein the processing of the compressed elements is performed in one or more cycles, wherein the processing in a cycle of the one or more cycles comprises:
    dispatching a subset of the compressed elements to the hardware vector of the execution unit; and
    processing each of the elements in the dispatched subset by a corresponding SIMD lane of a first plurality of SIMD lanes of the execution unit according to an opcode of the first predicated instruction.

11. The system of claim 10, wherein:
    the dispatching comprises,
       dispatching the subset of the compressed elements to a portion of the hardware vector, and
       dispatching other vector elements to another portion of the hardware vector; and
    the executing comprises,
       processing the other vector elements by a second plurality of SIMD lanes of the execution unit according to the opcode.

12. The system of claim 9, wherein the instructions stored in the memory further cause the processor to:
    for a second predicated instruction of the predicated instructions, determine that compression should not occur.

13. The system of claim 9, wherein the instructions stored in the memory further cause the processor to determine that compression should occur in response to the level of sparsity being above the threshold.

14. The system of claim 13, wherein the determining is based on a user parameter, a configuration parameter associated with the system, or a combination thereof.

15. The system of claim 13, wherein the determining is based on a number of the predicated instructions that are queued by the scheduler.

16. A non-transitory computer-readable medium comprising instructions executable by at least one processor to perform a method for processing a vector by a system, employing a vector processor, the method comprising:
  receiving, by a scheduler, predicated instructions; and
  executing the predicated instructions, wherein the executing of a first predicated instruction of the predicated instructions comprises:
    compressing elements in a first vector of the first predicated instruction, based on a comparison of a level of sparsity of a predicate of the first predicated instruction to a threshold that is based on a ratio of a number of elements in a hardware vector for executing the first predicated instruction and a number of elements in the first vector of the first predicated instruction, to generate compressed elements that are contiguously mapped as a second vector,
    processing, by an execution unit, the mapped elements in the second vector, generating processed mapped elements, and
    decompressing, by a decompressor, the processed mapped elements.

17. The non-transitory computer-readable medium of claim 16, wherein the method further comprises:
  for a second predicated instruction of the predicated instructions, determining that compression should not occur.

18. The non-transitory computer-readable medium of claim 16, wherein the processing of the compressed elements is performed in one or more cycles, wherein the processing in a cycle of the one or more cycles comprises:
  dispatching a subset of the compressed elements to the hardware vector of the execution unit; and
  processing each of the elements in the dispatched subset by a corresponding SIMD lane of a first plurality of SIMD lanes of the execution unit according to an opcode of the first predicated instruction.

* * * * *